(12) United States Patent
Cisar (10) Patent No.: US 10,369,621 B2
(45) Date of Patent: Aug. 6, 2019

(54) FORMING SYSTEM AND METHOD FOR TRANSPORTING WORK PIECES IN A FORMING SYSTEM

(71) Applicant: Schuler Automation GmbH & Co. KG, Hessdorf (DE)

(72) Inventor: Rolf Cisar, Engelthal (DE)

(73) Assignee: Schuler Automation GmbH & Co. KG, Hessdorf (DE)

( * ) Notice: Subject to any disclaimer, the term of this patent is extended or adjusted under 35 U.S.C. 154(b) by 705 days.

(21) Appl. No.: 14/437,563

(22) PCT Filed: Oct. 22, 2013

(86) PCT No.: PCT/EP2013/072103
§ 371 (c)(1),
(2) Date: Apr. 22, 2015

(87) PCT Pub. No.: WO2014/064123
PCT Pub. Date: May 1, 2014

(65) Prior Publication Data
US 2015/0298198 A1 Oct. 22, 2015

(30) Foreign Application Priority Data
Oct. 22, 2012 (DE) .......................... 10 2012 110 065

(51) Int. Cl.
*B21D 43/05* (2006.01)
*B21J 13/08* (2006.01)
(Continued)

(52) U.S. Cl.
CPC ............ *B21J 13/08* (2013.01); *B21D 43/055* (2013.01); *B21J 5/008* (2013.01); *B23K 37/047* (2013.01); *B23P 11/00* (2013.01); *B25J 11/00* (2013.01)

(58) Field of Classification Search
CPC ........ B21J 13/08; B23Q 7/003; B23Q 7/1478; B23Q 7/1426; B23Q 7/14; B21D 43/055; (Continued)

(56) References Cited

U.S. PATENT DOCUMENTS

| 4,852,381 A | 8/1989 | Sofy |
| 5,383,348 A * | 1/1995 | Michael ............... B21D 43/052 72/405.1 |

(Continued)

FOREIGN PATENT DOCUMENTS

| CN | 1121449 | 5/1996 |
| CN | 1171989 | 2/1998 |

(Continued)

*Primary Examiner* — Ronald P Jarrett
(74) *Attorney, Agent, or Firm* — Hoffmann & Baron, LLP (57) ABSTRACT

In a forming system in particular for metallic workpieces (31, 32) with several forming stations (21-23) a transport device (1) is provided with one or more rails (13) on which carriages (141, 142) can be moved. In a conventional mode of operation of the rails, it is provided that two carriages (141, 142) on the same rail (13) are moved by a varying distance relative to each other during the transport of a respective workpiece (31, 32) from one forming station (21-23) to another forming station (21-23), namely in particular are driven towards each other or away from each other with their distance relative to each other being increased or decreased. New production sequences can thereby be provided.

8 Claims, 4 Drawing Sheets (51) Int. Cl.
  *B23K 37/047* (2006.01)
  *B21J 5/00* (2006.01)
  *B23P 11/00* (2006.01)
  *B25J 11/00* (2006.01)
(58) Field of Classification Search
  CPC ...... B23K 37/047; B65G 47/34; B65G 47/90; B21K 25/00
  USPC ....... 29/786, 428; 414/222.13, 749.1, 752.1; 219/121.41
  See application file for complete search history.

(56) References Cited

U.S. PATENT DOCUMENTS

| | | |
|---|---|---|
| 5,557,959 A | 9/1996 | Wallis et al. |
| 5,993,143 A | 11/1999 | Eltze et al. |
| 6,314,786 B1 * | 11/2001 | Hofele ................. B21D 43/055 198/621.1 |
| 7,410,046 B2 * | 8/2008 | Shiroza ................. B21D 43/10 198/468.4 |
| 8,497,447 B2 * | 7/2013 | Heiml .................... B23P 21/00 219/121.41 |
| 2007/0289352 A1 | 12/2007 | Shiroza |
| 2008/0295564 A1 | 12/2008 | Kaneko et al. |
| 2012/0114451 A1 | 5/2012 | Nishida et al. |

FOREIGN PATENT DOCUMENTS

| | | |
|---|---|---|
| CN | 1980758 | 6/2007 |
| CN | 101052485 | 10/2007 |
| CN | 101563176 | 10/2009 |
| CN | 102470420 | 5/2012 |
| DE | 19506071 | 8/1996 |

\* cited by examiner

FORMING SYSTEM AND METHOD FOR TRANSPORTING WORK PIECES IN A FORMING SYSTEM

This application claims priority based on an International Application filed under the Patent Cooperation Treaty, PCT/EP2013/072103, filed on Oct. 22, 2013, and German Application No. DE102012110065.9, filed on Oct. 22, 2012.

BACKGROUND OF THE INVENTION

The invention relates to a forming system as well as a method for transporting workpieces in a press system.

EP 0 600 254 A1 shows a transport device for a press. At a forming station, a crossbar carriage is provided which is driven by means of toothed belts.

In DE 11 2006 000 904 B4, a workpiece-transferring device of a press machine is described which has a pair of movable carriers, with one carrier secured to a carrier drive device and one movable carrier arranged on the secured carrier. The press machine has forming stations arranged next to each other. The workpiece-transferring device delivers workpieces from one forming station to a neighboring forming station. A disadvantage is that the forming stations must have the same length measurements and the same distance in the transport direction.

A transport device with a transfer unit which transports workpieces along a transport direction one after another through several processing stations is shown from EP 0 754 510 A1.

SUMMARY OF THE INVENTION

The object of the present invention is to specify a forming system which does not have these disadvantages, as well as to specify a further improved method for transporting workpieces in a press system from in each case one forming station to another forming station.

According to the invention, this object is achieved, in a first aspect, with the subject of claim 1 and, in a second aspect, with the subject of claim 2. A forming system for preferably metallic workpieces (or also workpieces consisting of carbon fibers) is proposed, wherein the forming system is preferably formed as a press system, with several forming stations and with a transport device for transporting the workpieces, wherein the transport device has at least one rail, which carries at least two carriages that can be moved, in particular driven, relative to the rails, wherein the carriages are formed as part of a gripping apparatus and/or in each case carry at least one gripper, and wherein the carriages and/or at least one rail can be moved at least in one transport direction (in particular horizontally) in order to transport workpieces gripped by the gripping apparatus or the grippers from one forming station to another, wherein according to the first aspect it is provided that at least two carriages on the same rail are moved by a varying distance relative to each other during the transport of the workpieces from one forming station to another forming station, in that they are driven in contrary directions.

According to the second aspect, it is provided
a) that a first carriage of two carriages on the same rail moves a first workpiece from one forming station to another forming station in a first direction, and b) that during a) or after completion of a) a second carriage of the two carriages on the same rail moves a second workpiece from one forming station to the other forming station in the direction contrary to the first direction.

In the second aspect, it is preferably provided that during a) the second carriage is not moved. Furthermore, it can be provided that during b) the first carriage is moved back in the direction contrary to the first direction.

The background for these additional measures is that the first and the second carriages are not to collide with each other, in particular if the other forming station receives corresponding workpieces from both carriages at the same time, for instance when these are to be joined together in said forming station.

The at least one rail can in particular additionally be movable towards workpieces in a direction perpendicular to the transport direction. Alternatively, the workpieces can be gripped by an active gripping apparatus or grippers which makes or make a movement relative to the carriage itself possible.

Preferably, in the forming system according to the invention, the transport device has at least two rails which in each case carry at least two carriages that can be moved, in particular driven, relative to the rails, wherein the carriages of the two rails correspond to each other in pairs and are formed as part of a gripping apparatus and/or in each case carry at least one gripper, and wherein the rails can be moved towards each other in a closing direction to grip one or more workpieces and particularly preferably can be raised in a vertical raising direction in order to raise the gripped workpieces, wherein the rails and/or the carriages can be moved horizontally in a transport direction perpendicular to the closing direction in order to transport the workpieces from one forming station to another forming station, and wherein the optionally raised rails can then be lowered in a direction contrary to the vertical raising direction and (optionally subsequently) can be moved away from each other in order to deposit the workpieces.

It is not imperative for the rails to be able to move vertically. The case can be that of a transport device that moves purely in a two-dimensional plane. However, the raising in the vertical raising direction and the later, associated lowering of the rails is preferred.

The advantage of the forming system according to claim 1 or 2 is that there is an increased flexibility. It is no longer necessary for the forming stations to have to provide the same distance between stages (i.e. the same length measurements and the same distances relative to each other in the transport direction). In particular, a forming system with several forming stations can thereby be retrofitted with a suitable transport device.

The invention makes an entirely novel means of transport possible in which workpieces are transported in different transport directions by one and the same transport device with a pair of rails, with the result that independent branches in the processing line can be provided in one and the same forming system.

The first and the second workpieces are preferably moved towards each other.

In an advantageous development, it can be provided here that first workpieces are fed from a first side of one or more first forming stations and second workpieces are fed from a second side of one or more second forming stations, wherein a third forming station is arranged between the first and second forming stations, which third forming station is formed in particular to join in each case a pair of one first and one second workpiece, and wherein in each case first carriages on each rail grip the workpieces from the at least one first forming station and transport them in the direction, in particular, to the third forming station, and in each case second carriages on each rail grip the workpieces from the at least one second forming station and transport them in the direction, in particular, to the third forming station.

In this embodiment, the individual workpieces can be processed in each case separately first, before they are fed to the middle, third forming station; there a removal of the processed workpieces can take place, but they are preferably joined, in particular mated; in other words an assembled part can be processed in one and the same forming system in its two individual parts first, before these workpieces are then assembled. The preferred types of mating here are forming, for instance cold molding, compression molding and bend molding, as well as welding, adhesive bonding, clinching and joining by means of screws or rivets.

Further, an apparatus can be provided to carry away workpieces joined together in the third forming station.

This apparatus for carrying away makes a smooth processing sequence possible in the forming system, as the workpieces do not accumulate or pile up, in particular if the workpieces are not to be mated with each other.

The forming system can comprise a control apparatus which controls actuators that move the carriages, wherein the control apparatus can be designed, in particular programmed, such that the carriages are moved independently of each other, in particular by a varying distance (in contrary directions) relative to each other, namely towards each other and away from each other.

In this embodiment, one and the same transport device can be provided in different forming systems by suitable adaptation of the control apparatus (namely in particular even a programming of the control apparatus). The carriages are not moved on the basis of any coupling mechanics, but are controlled independently of each other, which facilitates a plurality of possibilities for driving the carriages in each case separately and relative to each other.

Further, it can be provided that, because of their design and/or connection to the rail, an in each case different travel length, in particular an in each case different maximum travel length, can be traversed by the at least two carriages on the same rail.

In the case of this measure, the transport device can be constructed tailored to the forming stations, with the result that the provision of a travel length of a carriage that is not at all necessary for the said forming system can be dispensed with.

In the system according to claim 5 or 6, also in the preferred embodiments, it is preferably provided that carriages corresponding to each other of the two rails can be driven in parallel to each other. This corresponds to the conventional procedure which in the present case is associated with the driving of two carriages on the respective same rail independently of each other.

It can also be provided that at least one and preferably each of the carriages serves to grip several workpieces from different forming stations. Thus, it is possible for example, for subgroups of forming stations which have in each case the same distance between the associated processing positions, for one and the same carriage to transport a workpiece from a first forming station to a neighboring second forming station and at the same time to transport one from a second forming station to a neighboring third forming station (or from a third to a fourth). The varying distance relative to another carriage then only takes into account the fact that another group of forming stations has a different distance between their respective processing positions.

The object is further achieved by a method for transporting workpieces in a press system from in each case one forming station to another forming station by means of at least one rail, in particular at least one pair of rails, on which in each case at least two carriages that can be driven relative to the rail are arranged, wherein it is provided that first workpieces and second workpieces are moved in contrary directions, preferably towards each other.

Here, the space present in a forming system can be used to allow different processing lines or branches to be traversed at the same time without a common transport device being dispensed with. A retrofitting with such a transport device in limited space is thereby possible.

It can be provided that the first and the second workpieces are transported towards each other into a common forming station for the purposes of joining (mating) in each case a pair of one first and one second workpiece.

If it is desired to join first and second workpieces together and process them beforehand, previously several forming systems had to be coupled together. The named embodiment makes it possible for all processing steps to take place in one and the same forming system.

In a first mode of operation, the first and the second workpieces are moved towards each other in each case in the same work step.

In a second mode of operation, in one work step the first workpiece is moved over a section of line towards the second workpiece, and in a separate work step the second workpiece is later moved towards the first workpiece, namely over the remaining section of line of the original distance between the two workpieces or over a little more than this remaining section of line. Both workpieces thus arrive in the same forming station. They can in particular be laid one over another.

In the second mode of operation, it can be provided in particular that a carriage or pair of carriages which transports the first workpiece is in fact moved in the contrary direction to the one in which a carriage or pair of carriages is moved which transports the second workpiece, but that because of the time offset the first carriage/the first pair of carriages is already driven back again when the second carriage is driven to the forming station. The second carriage/the second pair of carriages previously had to remain stationary, thus wait, until the first carriage/the first pair of carriages had deposited the first workpiece.

Similar forming stations can be arranged mirroring each other, with the result that the first and the second workpieces are processed in similar ways, in particular exactly identically. Here, one and the same forming system can be used such that similar processing steps are carried out on different workpieces more or less at the same time.

Further, it can be provided that all workpieces are gripped by means of carriages of both rails that correspond to each other and/or grippers on these carriages and moved at least by a driving of the carriages, optionally also a driving of the rails. Here, conventional modes of operation are built on.

It can be provided that, to grip the workpieces, two rails are driven towards each other and, for the transport, the rails are raised and that, to deposit the workpieces, the rails are driven down and moved apart. Here too, conventional modes of operation are built on.

BRIEF DESCRIPTION OF THE DRAWINGS

The invention is now explained in more detail with reference to embodiment examples. There are shown in FIG. 1 an embodiment example of a transport device of a forming system according to the invention in a perspective schematic diagram.

DETAILED DESCRIPTION OF THE INVENTION

Figure 1:
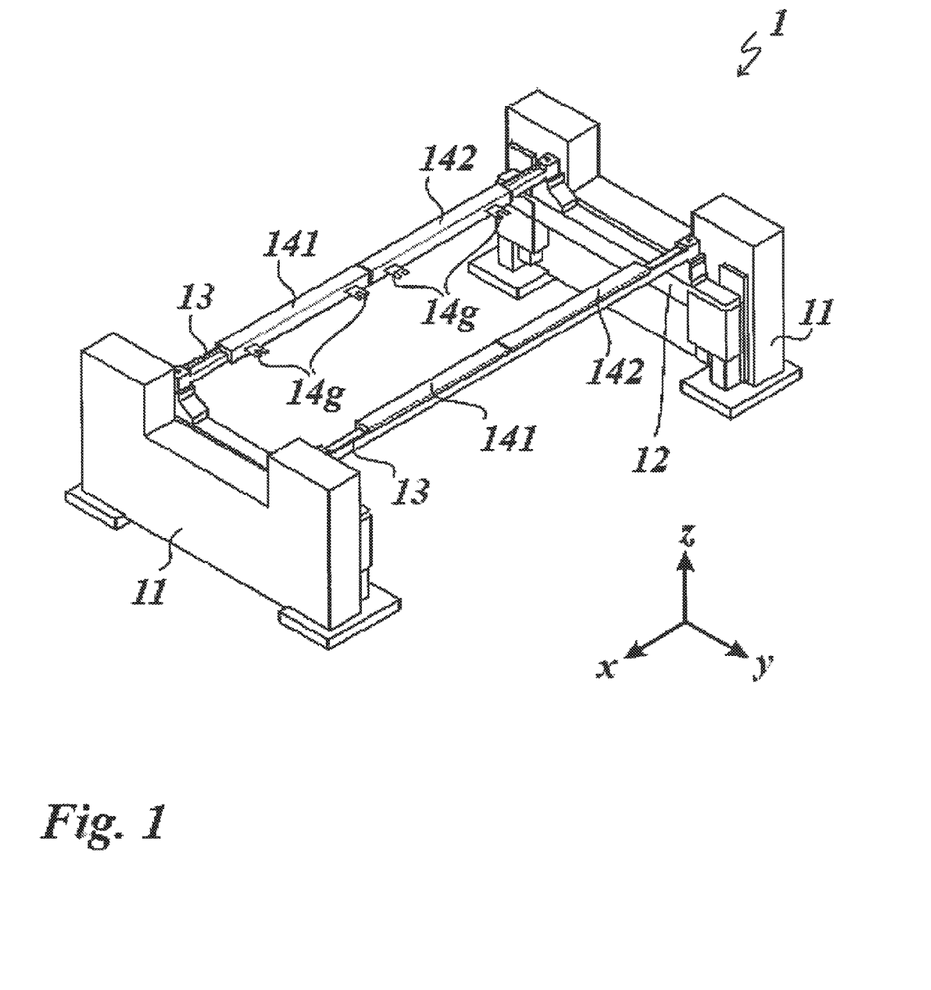
Figure 2A:
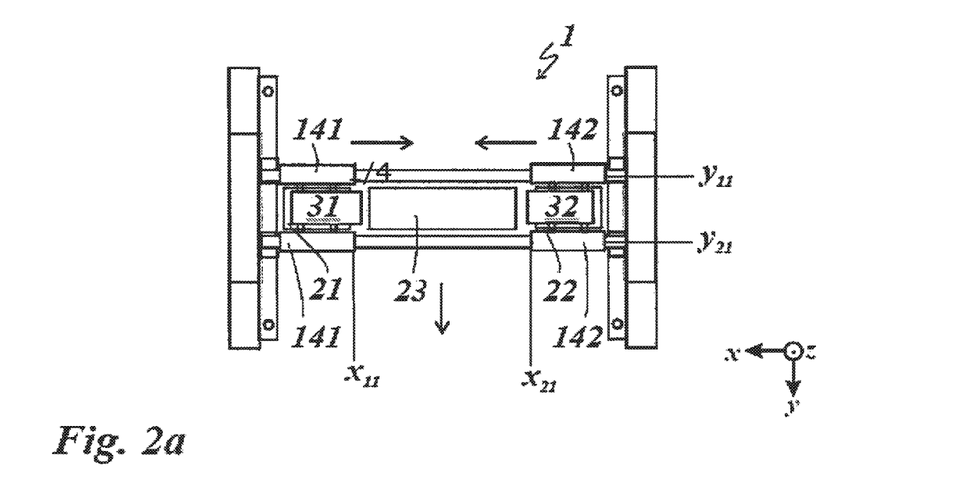
FIGS. 2a and 2b an embodiment example of a transport device of a forming system according to the invention in a schematic representation.
Figure 2B:
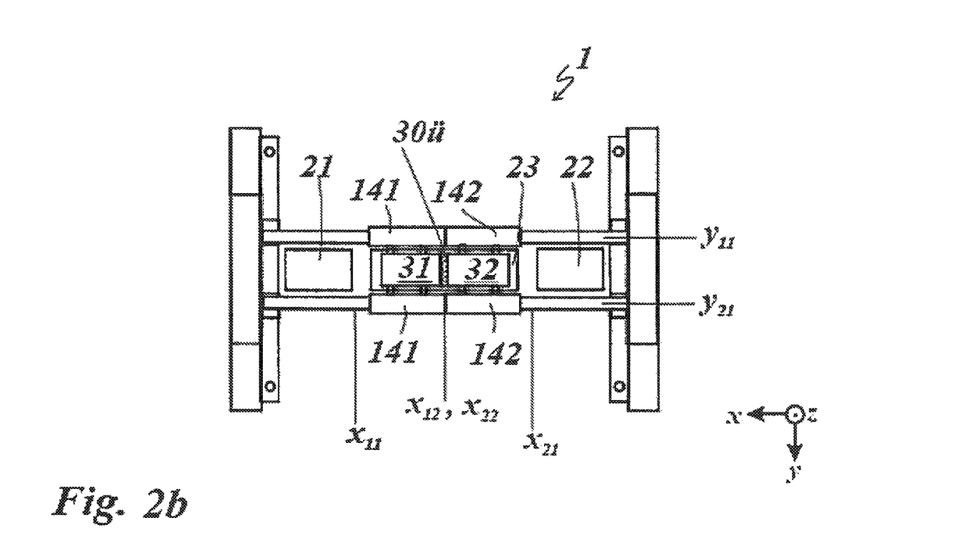

FIG. 1 shows a transport device 1 which is provided in order to transfer workpieces 31, 32 (see FIG. 2) from a first forming station to a second forming station of a forming system (see FIG. 2).

In FIG. 1, as well as in FIG. 2, a coordinate system is drawn in for orientation, wherein the z axis denotes the vertical and the x and y axes are the horizontal axes.

On the transport device 1 represented in FIG. 1, bearing blocks 11 opposite each other are shown. Cross-members 12 are arranged on these bearing blocks 11, longitudinal members, called rails 13 in the following, are supported on the cross-members 12, and carriages are arranged such that they can be driven on the rails 13 and arranged in pairs opposite each other. In the embodiment example represented in FIG. 1, two carriages 141 and 142 arranged in pairs are provided.

In each case two carriages 141, 142 opposite each other form a pair of carriages and can be driven independently on the rails 13 along the x axis, in particular in the direction towards each other and away from each other or also additionally in the same direction. On the sides facing each other, the carriages 141, 142 carry grippers 14g, which can be for example forked grippers or actively movable grippers, which grip the workpieces 31, 32.

The rails 13 can be moved on the cross-members 12 simultaneously in the direction of the y axis, i.e. simultaneously horizontally towards each other in a closing direction and away from each other in an opening direction. Alternatively, the rails 12 can be moved horizontally completely independently of each other.

The cross-members 12 can be driven simultaneously in the direction of the z axis, i.e. simultaneously vertically. Alternatively, the cross-members 12 can be driven vertically independently of each other. Thus the rails 13 can be moved vertically with the cross-members 12. The carriages 141 and 142 can thus be raised in a vertical raising direction in order to raise the gripped workpieces.

In FIGS. 2a and 2b an embodiment example of the transport device 1 is represented with carriages 141 and 142, which are provided to transport workpieces between (in the present example) three forming stations 21 to 23 arranged one behind another.

The carriages are moved towards each other and away from each other. Outer forming stations 21 and 22 are provided, between which an inner forming station 23 is arranged. The inner forming station 23 can be provided for example for the joining, the mating or the common processing of two workpieces 31, 32 which are fed from the outer forming stations 21 and 22 neighboring the inner forming station 23.

Two different modes of operation are possible.

The first mode of operation is explained first:

In the first work cycle represented in FIG. 2a, the grippers 14g of the carriages 141 receive the workpiece 31 deposited in the forming station 21 and the grippers 14g of the carriages 142 receive the workpiece 32 deposited in the forming station 22. The carriages 141 and 142 are in first x positions $x_{11}$ and $x_{21}$. The rails 13 are located in first y positions $y_{11}$ and $y_{21}$. The cross-members 12 are in a first z position $z_1$.

In a second work cycle, the workpieces 31 and 32 are taken out of the forming stations 21 and 22 as the cross-members 12 are raised simultaneously to a second z position $z_2$ which is higher than the first z position $z_1$.

In a third work cycle, the carriages 141 and 142 are driven on the rails 13 in the direction onto the forming station 23 and adopt second x positions $x_{12}$ and $x_{22}$. The carriages 141 and 142 are now arranged at the forming station 23. During the driving of the carriages 141 and 142 towards each other, the distance between the carriages is varied. This driving can take place in particular at the same time in the first mode of operation, i.e. such that both carriages are moved at the same time in an overlapping time segment. The rails 13 are located unchanged in the first y positions $y_{11}$ and $y_{21}$, the cross-members in the second z position $z_2$.

In a fourth work cycle represented in FIG. 2b, the workpieces 31 and 32 are deposited in the forming station 23 as the cross-members 12 are lowered back to the first z position $z_1$. The grippers 14g of the carriages 141 still grip, from below, the workpiece 31 deposited in the forming station 23 and the grippers 14g of the carriages 142 still grip, from below, the workpiece 32 likewise deposited in the forming station 23. The workpieces 31 and 32 are arranged one above another in an overlap area 30ü and can be joined together in this overlap area for example by forming. The overlap area 30ü can be an area of partial overlap of the workpieces 31 and 32, but it can also be a complete overlap (which is not shown in the figure). The removal of the workpiece formed of the two workpieces 31 and 32 after the forming can be provided perpendicular to the transport direction of the carriages 141, 142.

In a fifth work cycle, the rails 13 are driven apart and brought into second y positions $y_{12}$ and $y_{22}$, whereby the grippers 14g of the carriages 141 and 142 disengage from the workpieces 31 and 32.

In a sixth work cycle, the carriages 141 and 142 are driven back in the direction onto the outer forming stations 21 and 22. The carriages 141 and 142 are again arranged at the outer forming stations 21 and 22 and adopt the first x positions $x_{11}$ and $x_{21}$. During this driving apart, the distance between the carriages 141 and 142 is likewise varied, namely increased in the present case. The driving takes place in particular all at once, i.e. there is at least one time segment in which both carriages 141 and 142 are moved. The rails 13 are located unchanged in the second y positions $y_{11}$ and $y_{21}$, the cross-members 12 in the first z position $z_1$.

In a seventh work cycle, the rails 13 are brought into the first y positions $y_{11}$ and $y_{12}$, with the result that the grippers 14g of the carriages 141 and 142 grip, from below, new workpieces deposited in the outer forming stations 21 and 22.

The first distance between the first position $x_{11}$ on the one hand and the second position $x_{12}$ on the other hand can be different from the second distance between the second position $x_{21}$ on the one hand and the second position $x_{22}$ on the other hand. In this case, the carriages 141 and 142 can be driven towards each other or away from each other at different speeds. Moreover, in a sequence of several forming stations there can be different distances between them. If several carriages are then moved in the same direction, this can take place by a varying distance (due to a different driving speed) because of the different distances between the forming stations. This can take place on one side or on both sides with in each case a plurality of carriages moved in the same direction which are moved towards each other in relation to each other.

The second mode of operation of the transport device 1 with the carriages 141 and 142 according to FIGS. 2a and 2b is now explained:

In a first work cycle, the grippers 14g of the carriages 141 receive the workpiece 31 deposited in the forming station 21. However, the grippers 14g of the carriages 142 do not yet receive the workpiece deposited in the forming station 22. The carriages 141 and 142 are in first x positions $x_{11}$ and $x_{21}$. The rails are located in first y positions $y_{11}$ and $y_{21}$. The cross-members are in a first z position $z_1$.

In a second work cycle, the workpiece 31 is taken out of the forming station 21 as the cross-members 12 are raised simultaneously to a z position $z_2$ which is higher than the first z position $z_1$.

In a third work cycle, the carriages 141 are driven on the rails 13 in the direction onto the forming station 23 to the x position $x_{12}$. The carriages 142 are not driven. During the driving of the carriages 141 towards the carriages 142, the distance between the carriages 141 and 142 is varied. The rails are located unchanged in the first y positions $y_{11}$ and $y_{21}$, the cross-members in the second z position $z_2$.

In a fourth work cycle, the workpieces 31 are deposited in the forming station 23 as the cross-members 12 are lowered back to the first z position $z_1$. The grippers 14g of the carriages 141 still grip, from below, the workpiece 31 deposited in the forming station 23.

In a fifth work cycle, the rails 13 are driven apart and brought into second y positions $y_{12}$ and $y_{22}$, whereby the grippers 14g of the carriages 141 disengage from the workpiece 31.

In a sixth work cycle, the rails 13 are brought into the first y positions $y_{11}$ and $y_{12}$, with the result that the grippers 14g of the carriages 142 grip, from below, a workpiece 32 deposited in the outer forming station 22.

In a seventh work cycle, the workpiece 32 is taken out of the forming station 22, as the cross-members 12 are raised simultaneously back to the second z position $z_2$.

In an eighth work cycle, the carriages 142 are driven on the rails 13 in the direction onto the forming station 23 and adopt a second x position $x_{22}$. The carriages 141 are driven in the same work cycle, preferably at the same time as the carriages 142, namely from the inner forming station 22 to the outer forming station 21. The rails 13 are located in the first y positions $y_{11}$ and $y_{21}$, the cross-members in the second z position $z_2$.

In a ninth work cycle, the workpiece 32 is deposited in the forming station 23 as the cross-members 12 are lowered back to the first z position $z_1$. The grippers 14g of the carriages 142 still grip, from below, the workpiece 32 deposited in the forming station 23. Now, the workpieces 31 and 32 are arranged one above another in the overlap area 30ü. In the case of the second mode of operation, this can be in particular a complete overlap.

In a tenth work cycle, the rails 13 are driven apart and brought into the second y positions $y_{12}$ and $y_{22}$, whereby through the grippers 14g of the carriages 142 disengage from the workpiece 22.

In an eleventh work cycle, the two workpieces 31 and 32 are mated in the forming station 23, thus by the die of the press.

At the same time, the carriages 142 are driven back to the outer forming station 22 (position $x_{21}$).

Then, the first work cycle starts again, in which the rails 13 are simultaneously driven into the first y positions $y_{11}$ and $y_{21}$ in the direction towards each other. In the forming stations 21 and 22 new workpieces 30 and 31 are ready.

Figure 3:
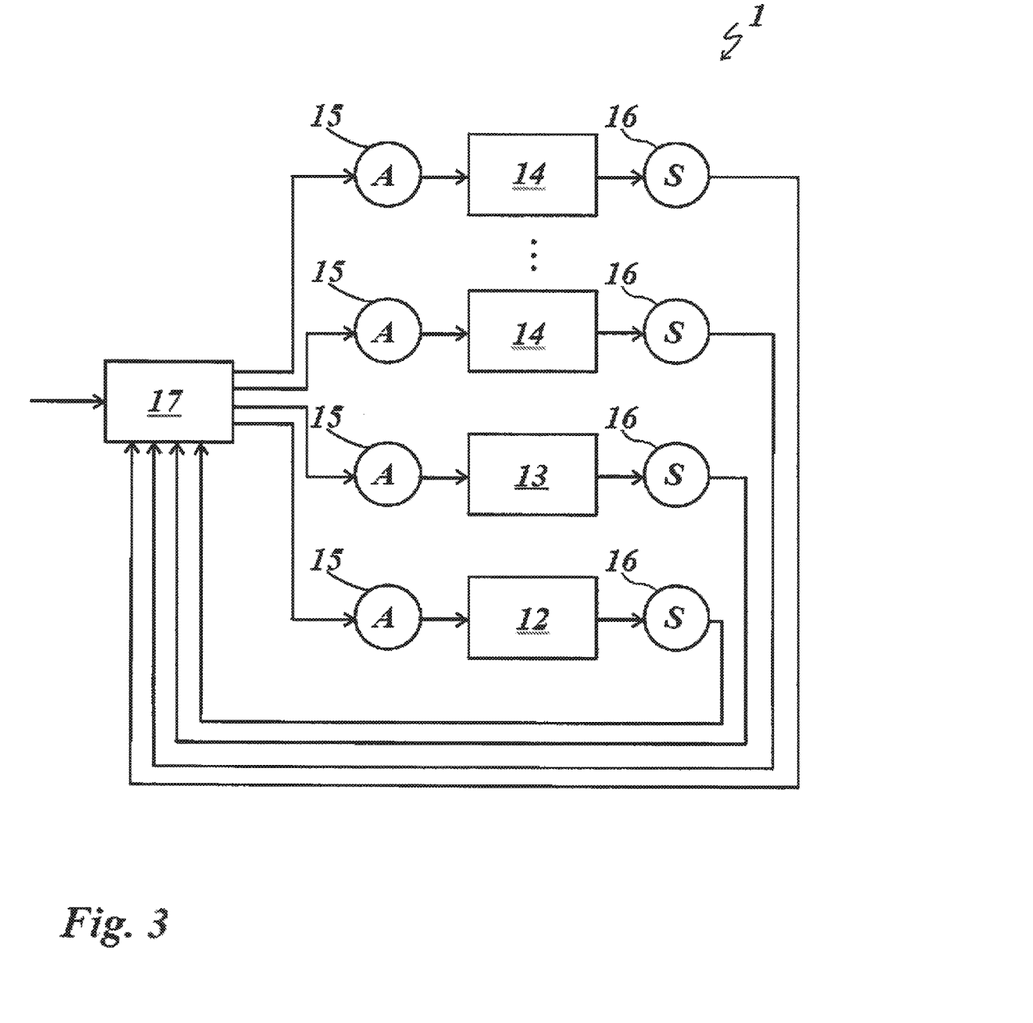
FIG. 3 a block diagram of the transport apparatus.

FIG. 3 shows a block diagram of the transport apparatus 1.

A control apparatus 17 is connected, on the output side, to actuators 15, which can be for example electric motors with rotary output or linear output which are immovably connected to the cross-members 12, the rails 13 and carriages 14. Further, sensors, preferably position sensors, are provided which are connected, on the input side, to the cross-members 12, the rails 13 and the carriages 14 and are connected, on the output side, to inputs of the control apparatus 17. In this way, it is possible to use the transport apparatus 1 for different transport tasks without configuring the mechanical structure. Thus, for example, in the embodiment example described previously in FIG. 2 changes to the programming of the control apparatus 17 make it possible, with the same mechanical structure, to drive the carriages 141 and 142, optionally by a varying distance, also in parallel to each other.

The programming of the control apparatus 17 can in particular bring about a simultaneous driving of the carriages 141 and 142 in the above-described way, thus by a varying distance (in the present case towards each other or away from each other). This driving can preferably even take place simultaneously, in particular because of the programming, i.e. the position of one carriage 141 corresponds to a predetermined position of the other carriage 142. Alternatively, however, it would also be possible to move the carriages 141 and 142 independently of each other, with the result that they need not necessarily be driven at the same time. However, as soon as one of the carriages is moved and the other is not, the distance between the carriages 141 and 142 varies.

Figure 4:
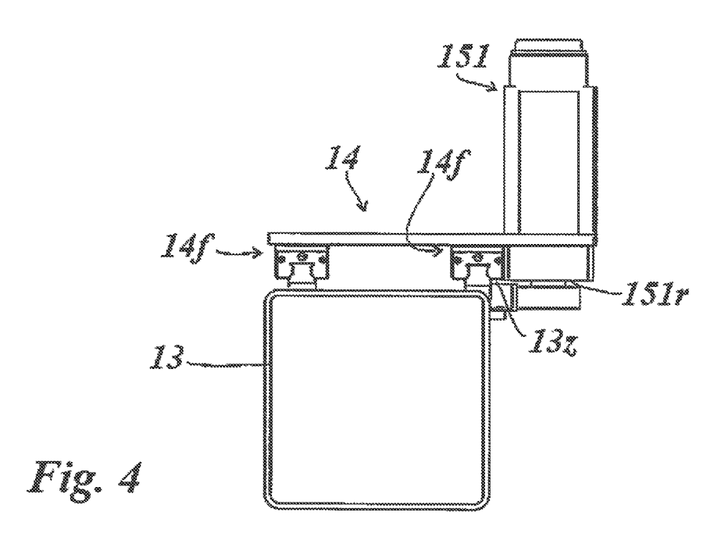
FIG. 4 a first embodiment example of a carriage drive.
Figure 5:
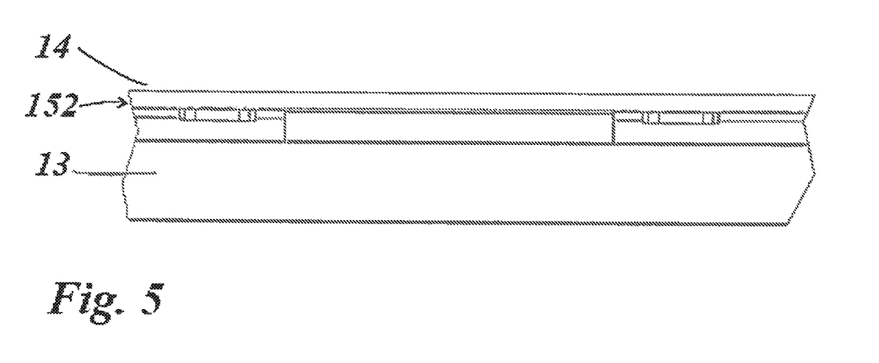
FIG. 5 a second embodiment example of a carriage drive.

FIGS. 4 and 5 show embodiment examples of the drives of the carriages.

FIG. 4 shows a carriage drive in which the carriage 14 is mounted on carriage guides 14f which are arranged spaced apart from each other on the rail 13. An electric drive motor 151, the output of which is formed as an output pinion 151r and cooperates with a toothed rod 13z arranged on the rail, is arranged on the carriage 14.

FIG. 5 shows a carriage drive with a linear motor 16 which is arranged on the rail 13, wherein the stator of the linear motor 16 is rigidly connected to the rail 13 and the rotor of the linear motor 16 is rigidly connected to the carriage 14.

Instead of a carriage drive with toothed rod and output pinion or with linear drive, a spindle drive or a toothed belt drive can also be provided. All named drives can in addition also be provided in any combinations.

LIST OF REFERENCE NUMBERS 1 transport device
11 bearing block
12 cross-member
13 rail
13z toothed rod
14 carriage
14f carriage guide
14g gripper
15 actuator
16 sensor
17 control apparatus
21 to 23 forming station
30ü overlap area 31, 32 workpiece
141, 142 carriage
151 drive motor
151r output pinion
152 linear motor The invention is claimed is:

1. A forming system for metallic workpieces, as a press system,
with several forming stations and with a transport device for transporting the workpieces,
wherein the transport device has at least one rail, which carries at least two carriages that can be driven, relative to the rail,
wherein the carriages are formed as part of a gripping apparatus or in each case carry at least one gripper, and
wherein the at least one rail or the carriages can be moved at least in one transport direction in order to transport workpieces gripped by the gripping apparatus or the grippers from one forming station to another forming station, and
wherein the system comprises a control apparatus which controls actuators that move the carriages, wherein the control apparatus is designed or programmed such that the carriages can be moved independently of each other, with the result that
a) a first carriage of two carriages on the same rail moves a first workpiece from one forming station to another forming station in a first direction, and
b) during a) or after completion of a), a second carriage of the two carriages on the same rail moves a second workpiece from one forming station to the other forming station in the direction contrary to the first direction, and
wherein the first workpiece is fed from a first side of one or more first forming stations and the second workpiece is fed from a second side of one or more second forming stations, wherein a third forming station is arranged between the first and second forming stations, which third forming station is formed to join in each case a pair of one first and one second workpiece, and wherein in each case the first carriage on each rail grips the workpieces from the at least one first forming station and transports them in the direction of the third forming station, and in each case the second carriage on each rail grips the workpieces from the at least one second forming station and transports them in the direction of the third forming station.

2. The forming system according to claim 1, wherein the control apparatus is designed such that
during a), the second carriage is not moved or such that during b), the first carriage is moved back in the direction contrary to the first direction.

3. The forming system according to claim 1,
wherein the transport device has at least two rails which in each case carry at least two carriages that can be driven, relative to the rails,
wherein the carriages of the two rails correspond to each other in pairs,
wherein the rails can be moved towards each other in a closing direction to grip one or more workpieces,
wherein the rails or the carriages in each case can be moved horizontally in a transport direction perpendicular to the closing direction in order to transport the workpieces from one forming station to another forming station, and
wherein the rails can be moved away from each other in order to deposit the workpieces.

4. The forming system according to claim 3, wherein the rails can be raised in a vertical raising direction in order to raise the gripped workpieces and can be lowered in a direction contrary to the vertical raising direction in order to deposit the workpieces.

5. The forming system according to claim 3, wherein carriages corresponding to each other of the two rails are driven in parallel to each other.

6. The forming system according to claim 1, wherein, because of their design or connection to the rail, an in each case different maximum travel length, can be traversed by the at least two carriages on the same rail.

7. The forming system according to claim 1, wherein each of the carriages serves to grip several workpieces from different forming stations.

8. A forming system for workpieces comprising:
a first forming station at a first end of the forming system;
a second forming station at a second end of the forming system opposite the first end;
a third forming station disposed between the first and second forming stations, the third forming station being adapted to join a first workpiece transported from the first forming station to a second workpiece transported from the second forming station; and
a transport device for transporting the workpieces between the first, second and third forming stations, the transport device comprising:
at least one rail extending between the first and second forming stations;
a first carriage movably supported on the rail, the first carriage including a first actuator for driving the first carriage relative to the rail and a first gripper for gripping the first workpiece;
a second carriage movably supported on the rail, the second carriage including a second actuator for driving the second carriage relative to the rail and a second gripper for gripping the second workpiece; and
a controller for individually controlling the first and second actuators, the controller being adapted to move the first carriage independently of the second carriage such that the first carriage can move on the same rail toward and away from the second carriage between the first and third forming stations and the second carriage can move on the same rail toward and away from the first carriage between the second and third forming stations, with the result that the first and second carriages can be moved on the same rail by a varying distance relative to each other during the respective transport of the workpieces from one forming station to another forming station.

* * * * *